United States Patent [19]

Wery

[11] Patent Number: 5,158,218

[45] Date of Patent: Oct. 27, 1992

[54] PRESSURIZED FLUID DISPENSING DEVICE

[76] Inventor: Shawn D. Wery, 3268 Bolgos Cir., Ann Arbor, Mich. 48105

[21] Appl. No.: 530,855

[22] Filed: May 30, 1990

[51] Int. Cl.⁵ ............................................. F04B 33/00
[52] U.S. Cl. ..................................... 222/610; 222/505; 222/181; 222/394; 222/401; 280/288.4; 224/30 R
[58] Field of Search ...................... 222/2, 74, 175, 181, 222/185, 39 S, 608, 609, 610, 505, 394, 401; 280/288.4; 224/30 R, 32 R, 35, 39; 604/79

[56] References Cited

U.S. PATENT DOCUMENTS

| | | | |
|---|---|---|---|
| 581,767 | 5/1897 | Powers | 222/610 X |
| 3,459,333 | 8/1969 | Inglefield | 222/64 |
| 3,677,446 | 7/1972 | Guyer, Jr. et al. | 222/610 |
| 4,095,812 | 6/1978 | Rowe | 224/32 R |
| 4,139,130 | 2/1979 | Glusker et al. | 222/175 X |
| 4,274,552 | 6/1981 | Proni | 222/61 |
| 4,274,566 | 6/1981 | Rowe | 222/610 X |
| 4,368,897 | 1/1983 | Brown | 224/32 R X |
| 4,386,721 | 6/1983 | Shimano | 224/39 |
| 4,441,638 | 4/1984 | Shimano | 224/39 X |
| 4,449,653 | 5/1984 | Pirolli | 224/32 R X |
| 4,629,098 | 12/1986 | Eger | 222/529 X |
| 4,717,051 | 1/1988 | Leclerc | 222/185 X |
| 4,807,813 | 2/1989 | Coleman | 280/288.4 |
| 4,813,933 | 3/1989 | Turner | 604/79 |
| 4,815,635 | 3/1989 | Porter | 280/288.4 |
| 4,911,339 | 3/1990 | Cushing | 222/610 |
| 4,930,668 | 6/1990 | Krall | 222/185 X |
| 5,046,648 | 9/1991 | Herbstzuber | 222/181 X |
| 5,062,591 | 11/1991 | Runkel | 222/175 X |

Primary Examiner—Michael S. Huppert
Assistant Examiner—Kenneth DeRosa
Attorney, Agent, or Firm—Ronald P. Kananen

[57] ABSTRACT

A pressurized fluid dispensing device for storing and dispensing pressurized fluid, such as water, to athletes during the performance of their particular activity, particularly endurance events such as a bicycle tour, biathlon, triathlon and the like. The pressurized fluid dispensing device may be mounted to the frame of a bicycle between the vertical and diagonal supports above the center bracket or crank assembly to provide as low as possible center of gravity. The device includes a support cage, fluid vessel, tubing and an actuateable valve. The fluid vessel may be pressurized and slidingly inserted into the support cage to supply fluid through the tubing to the valve. A check valve extends from the bottom of the vessel which is sealingly engageable with a recess formed in the bottom of the support cage through which the fluid may flow. The actuateable valve is actuated to dispense fluid by being bitten. In addition, the actuateable valve may be actuated by hand to spray fluid therefrom to refresh the rider.

6 Claims, 10 Drawing Sheets

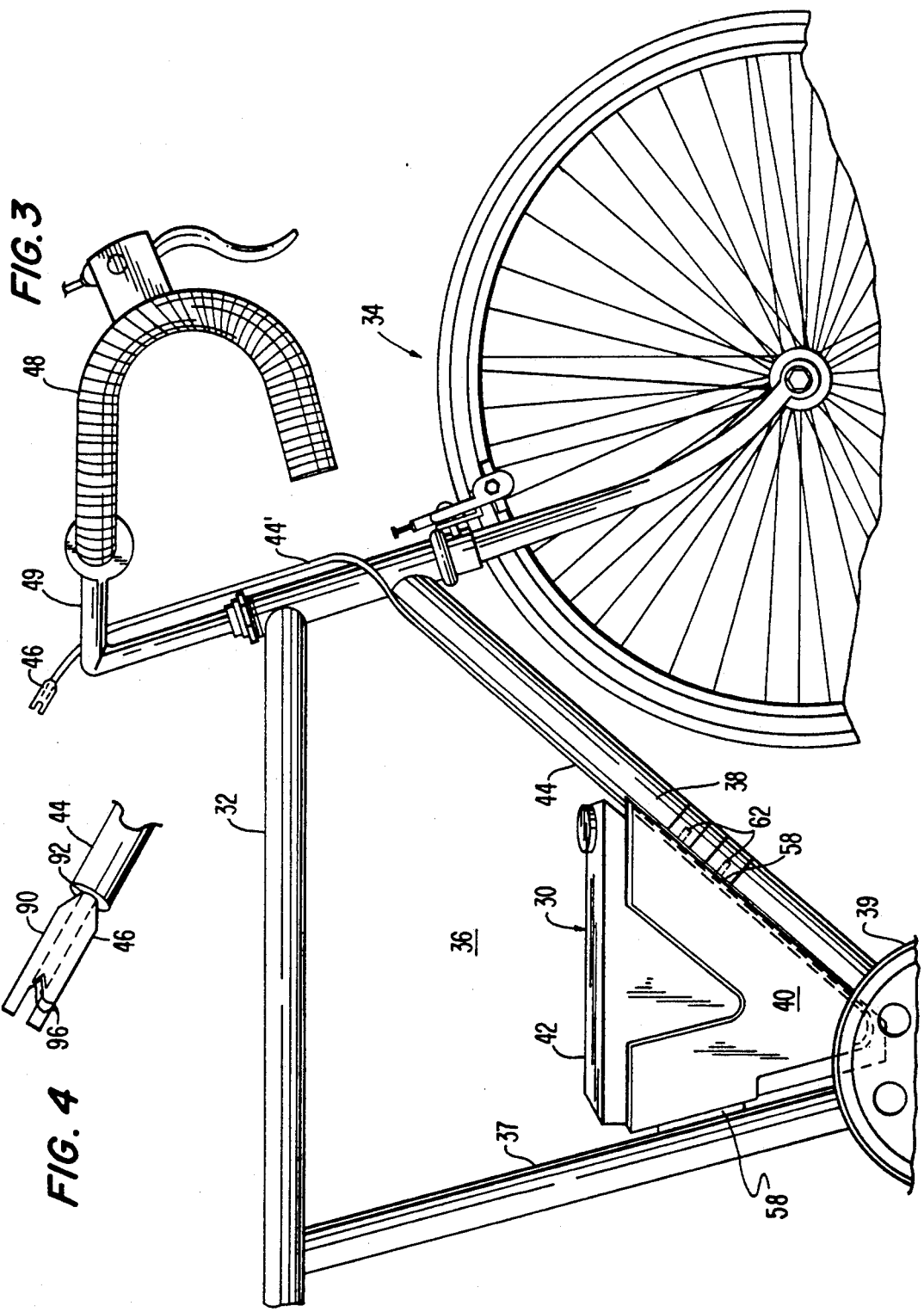

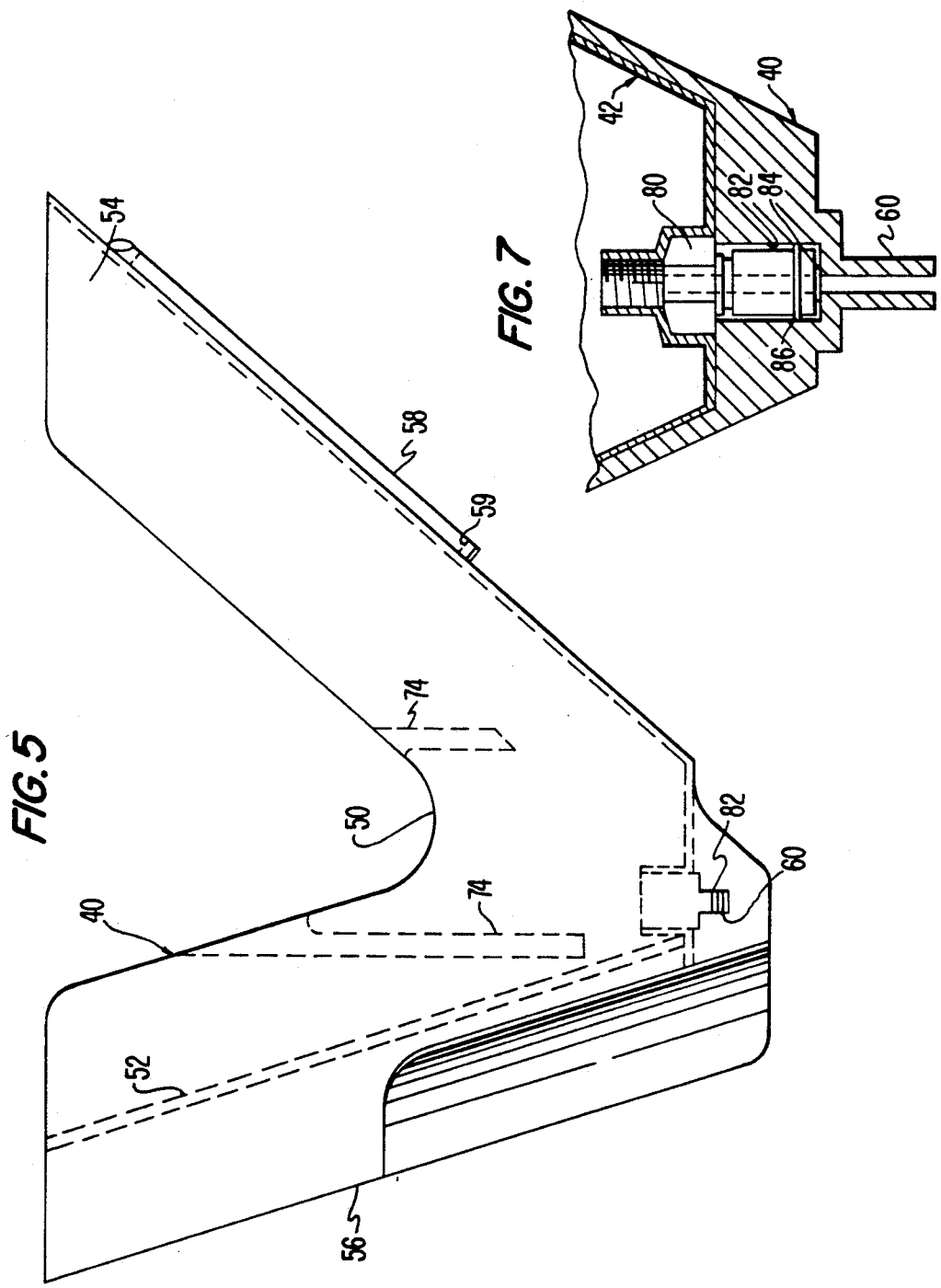

PRESSURIZED FLUID DISPENSING DEVICE

FIELD OF THE INVENTION

The present invention relates generally to devices for storing and dispensing fluids and, specifically, to a device for storing and dispensing pressurized fluid such as water to athletes and other individuals similarly situated during the performance of their particular activity.

BACKGROUND OF THE INVENTION

Devices for storing and/or dispensing fluids, such as water, are well known within the art and have had various forms and functions over the years, for example, as disclosed in U.S. Pat. Nos. 4,911,339 (Cushing), 4,815,635 (Porter), 4,807,813 (Coleman), 4,441,638 (Shimano), 4,386,721 (Shimano) and 4,095,812 (Rowe), the disclosures of which are hereby incorporated by reference as though fully set forth herein.

Some of the prior devices relate to water bottles for use by bicyclists to quench one's thirst without the need to stop and dismount the bicycle. Accordingly, such water bottles are removably mounted along the bicycle frame to be removed by the rider during use of the bicycle. However, such water bottles have several disadvantages and limitations associated with their use. For example, one problem associated with the use of the type of devices disclosed in U.S. Pat. Nos. 4,441,638 (Shimano) and 4,386,721 (Shimano), is that use of the device diverts the rider's attention from the road for both removal and, particularly, return of the bottle to its support cage or holder. In addition, the rider is forced to steer and balance the bicycle with only one hand. It is also necessary for the rider to change her/his body position to a less aerodynamic body position and change the cadence of her/his pedaling pace.

Another limitation associated with such devices is caused by the location of the water bottle, which are usually located beneath the rider along the diagonal support or the vertical support of the bicycle frame. Such a location raises the center of gravity which is preferably as low as possible.

Several of the prior devices attempt to overcome or minimize such limitations by including a straw or tubing connected to the water bottle by which the rider may obtain fluid. These types of devices are disclosed in U.S. Pat. Nos. 4,911,339 (Cushing), 4,815,635 (Porter) and 4,095,812 (Rowe). However, limitations remain with respect to the use of such devices, particularly during endurance events utilizing bicycles such as a tour, biathlon, triathlon and like, During such events, the rider's body requires repeated replenishment of fluids and electrolytes over an extended period of time due to dehydration. The water bottles for such devices do not hold a sufficient quantity of fluid for use during the entire event and as a result of their construction are not readily replaceable during the event. Accordingly, the fluid supply needs to be replenished by refilling the water bottle while remaining mounted to the bicycle. To simply enlarge the size of the water bottles, would add undue weight to the bicycle and hinder access to the fluid.

In addition, the devices disclosed in the patents to Cushing and Porter both attempt to supply pressurized fluid to the rider. But in order to dispense the water, the devices require manipulation by the rider, which again diverts the attention of the rider from the road. For example, the device disclosed in the patent to Cushing requires that the water be pressurized by a hand pump in the form of a pleaded bellows or otherwise pumped by a nozzle assembly. Similarly, the device disclosed in the patent to Porter requires manipulation by hand of a diaphragm-type pump in order to supply water to the rider.

Thus, there has been a need for a pressurized fluid dispensing device, which would eliminate the problems and limitations associated with the prior devices discussed above, most significant of the problems being associated with the use of such devices in endurance events. These and other objects will be apparent from the following detailed description and appended claims.

SUMMARY OF THE INVENTION

In contrast to the prior devices discussed above, it has been found that a pressurized fluid dispensing device particularly suited for use during endurance events such as for example a bicycle tour, biathlon, triathlon and the like can be constructed which is able to dispense fluid contained therein without diverting the attention of the rider from the road and without requiring manipulation of the device by the rider's hand. In addition, the device of the present invention is lightweight, streamline, and able to be located on the bicycle such as to get the center of gravity as low as possible. Further, the portion of the device containing the fluid supply is readily removable and replaceable to insure that sufficient fluid is made available to the rider for an extended period of time during endurance events.

The pressurized fluid dispensing device of the present invention includes a vessel, a support cage, tubing, a check valve and an actuateable valve. The vessel is for storing a fluid therein under pressure, and the vessel is adapted to include a sealable opening. The support cage is for releasably supporting the vessel and sealingly engaging the vessel means. The tubing is for communicating the fluid from the vessel to an athlete. The check valve is in fluid communication with the vessel, the support cage and the tubing so that when the vessel is sealingly engaged with the support cage, fluid may flow through the check valve from the vessel along the tubing. The actuateable valve is sealingly connected to an end of the tubing for selectively dispensing fluid from the tubing upon actuation of the valve by the mouth of the athlete.

In the disclosed embodiment, the pressurized fluid dispensing device is for use by athletes in endurance events, such a bicycle tour, biathlon, triathlon and the like. The device includes a vessel, a support cage, tubing, a check valve and an actuateable valve. The vessel is for storing a fluid therein under pressure, and the vessel is adapted to include a bottom and a sealable opening through which fluid may be introduced into the vessel. The support cage is mountable to the frame of a bicycle for releasably supporting the vessel and sealingly engageable with the vessel. The check valve extends from the bottom of the vessel in fluid communication with the vessel. The check valve is sealingly engageable with the support cage so that when the vessel is sealingly engaged with the support cage, fluid may flow through the check valve from the vessel through the support cage. The check valve is engageable with a pressurizable device for pressurizing the fluid contained within the vessel. The tubing communicates the fluid from the vessel to an athlete. The tubing is adapted to be connected at an end to the check valve.

The actuateable valve is sealingly connected to an other end of the tubing for selectively dispensing fluid from the tubing upon actuation of the valve by the mouth of the athlete.

In the disclosed embodiment, the check valve is adapted for engagement with a pressurizing device for pressurizing the fluid contained within the vessel. The device also includes an adapter, whereby the check valve and the pressurizing device may be interconnected.

In an alternative embodiment, the pressurized fluid dispensing device of the present invention includes a vessel, a support cage, a mounting assembly, a check valve, tubing, and an actuateable valve. The vessel has a top, a bottom, a generally vertical side, a generally diagonal side, two generally lateral sides, and a sealable opening in the top, with the vessel being pressurizable. The support cage is mountable to the frame of a bicycle and has a generally vertical side, a generally diagonal side, and a bottom. The mounting assembly attaches the support cage to the bicycle frame. The check valve extends from the bottom of the vessel in fluid communication with the vessel and is sealingly engageable with a recess formed in the bottom of the support cage, so that when the vessel is sealingly engaged with the support cage, the fluid may flow through the check valve from the vessel. The flexible tubing has a first end and a second end, with the tubing attached at the first end to the bottom of the support cage in fluid communication with the check valve for communicating the fluid from the vessel to an athlete. The actuateable valve is sealingly connected to the second end of the tubing for selectively dispensing fluid from the tubing upon actuation of the actuateable valve by the mouth of the athlete.

In the preferred embodiment, the actuateable valve includes a deformable, hollow member, whereby when a cyclist deforms the deformable, hollow member by biting thereon, fluid is released through one end thereof. In addition, the support cage is mountable above a crank assembly of the bike and engageable with a generally vertical support of the frame and a generally diagonal support of the frame. The check valve includes an extending portion which upon being moved permits the flow of fluid through the check valve.

Further, the device includes a cap for sealing the opening in the vessel. Also, the vessel is of generally wedge-shape and the support cage is of generally V-shape.

BRIEF DESCRIPTION OF DRAWINGS

The various features, objects, benefits, and advantages of the present invention will become more apparent upon reading the following detailed description of the preferred embodiment along with the appended claims in conjunction with the drawings, wherein like reference numerals identify corresponding components, and:

FIG. 3 is an enlarged, fragmentary view of the bicycle illustrating an alternative embodiment of the pressurized fluid dispensing device illustrated in FIG. 1;

FIG. 4 is an enlarged, fragmentary view of the actuateable valve of the pressurized fluid dispensing device illustrated in FIG. 3;

FIG. 5 is a side view of the support cage of the pressurized fluid dispensing device;

FIG. 7 is an enlarged, fragmentary side view of the check valve inserted into the recess of the support cage of the pressurized fluid dispensing device;

DETAILED DESCRIPTION OF THE PREFERRED EMBODIMENT

The pressurized fluid dispensing device of the present invention is illustrated in FIGS. 1-18 and is generally designated as 30.

Figure 1:
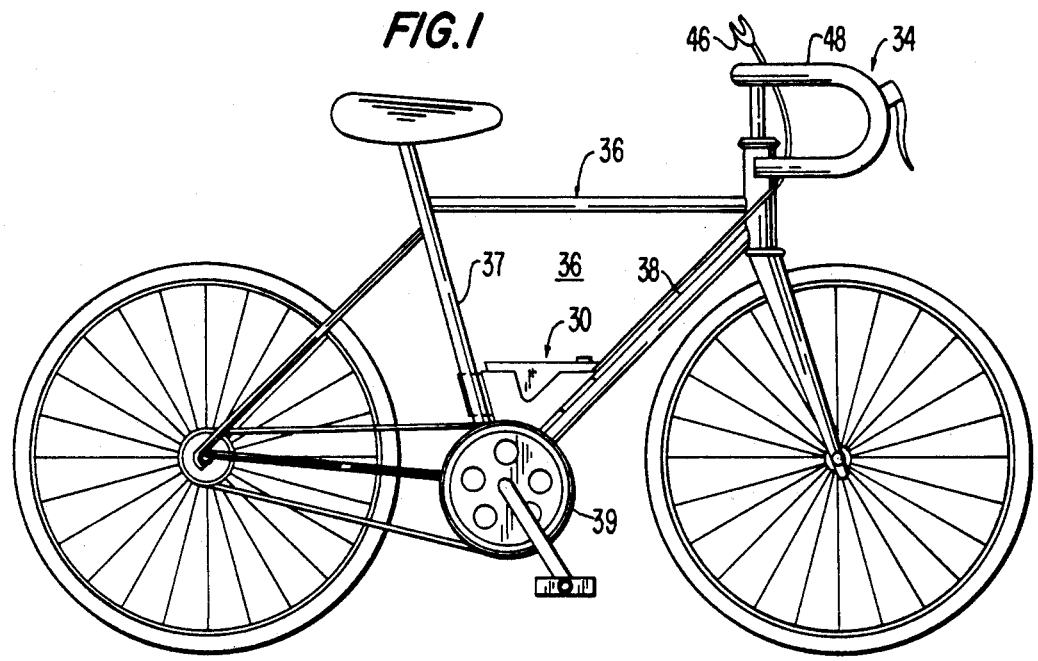
FIG. 1 is perspective, side view of a bicycle illustrating the pressurized fluid dispensing device of the present invention mounted to the frame of the bicycle.
Figure 18:
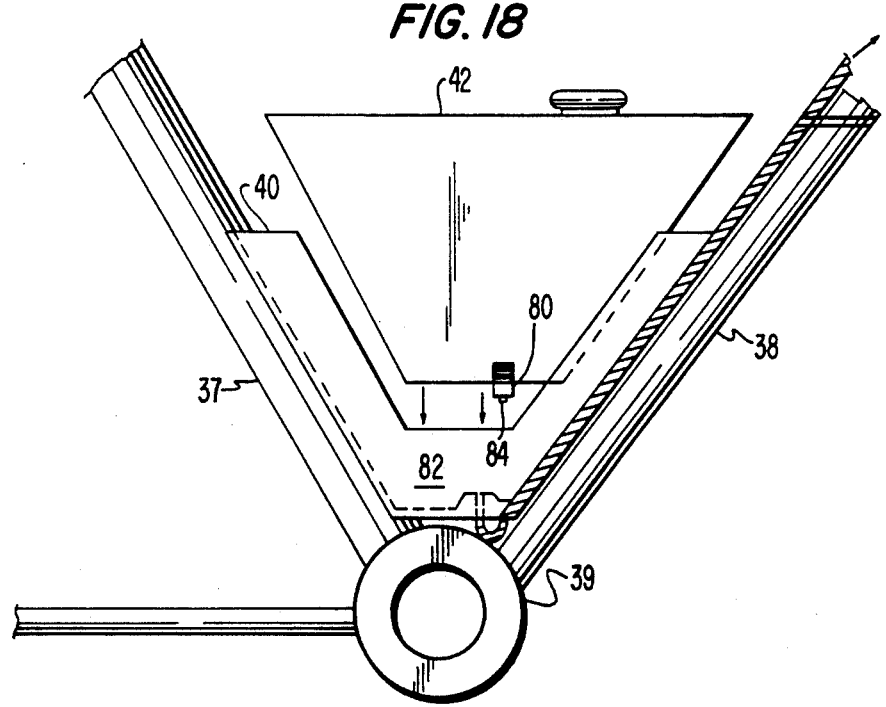
FIG. 18 is a side view illustrating insertion of the support cage into the fluid vessel.

Referring to FIG. 1, the pressurized fluid dispensing device 30 of the present invention may be mounted to the frame 32 of a bicycle 34 of ordinary construction. As illustrated in greater detail in FIGS. 2 and 3, the pressurized fluid dispensing device 30 is mounted at the bottom of the frame triangle 36 between the generally vertical support or seat tube 37 and the generally diagonal support or down tube 38 above the center bracket or crank assembly 39 to get the weight and center of gravity as low as possible.

The pressurized fluid dispensing device 30 of the present invention includes a support cage or housing 40, a fluid vessel or bottle 42, tubing 44 and an actuateable valve 46. The tubing is preferably flexible and of sufficient length to extend from the pressurized fluid dispensing device 30, along the diagonal support 38 of the bicycle frame, between the support cage 40 and the vessel 42, and past the handle bars 48 of the bicycle. In addition, the tubing may include a second piece of tubing 44' which is stiffer and will retain its shape and positioning upon being bent, such a tubing 44' may include wire reinforced tubing.

The tubing 44 or 44' may be attached to the handle bars 48 by a zip tie, clamp or other means 49 for attaching and holding the tubing in place. In the event arrow type bars are used, the tubing may be further extended over the wheel of the bicycle so that the rider does not have to lean forward or otherwise change position to obtain fluid.

Figure 6:
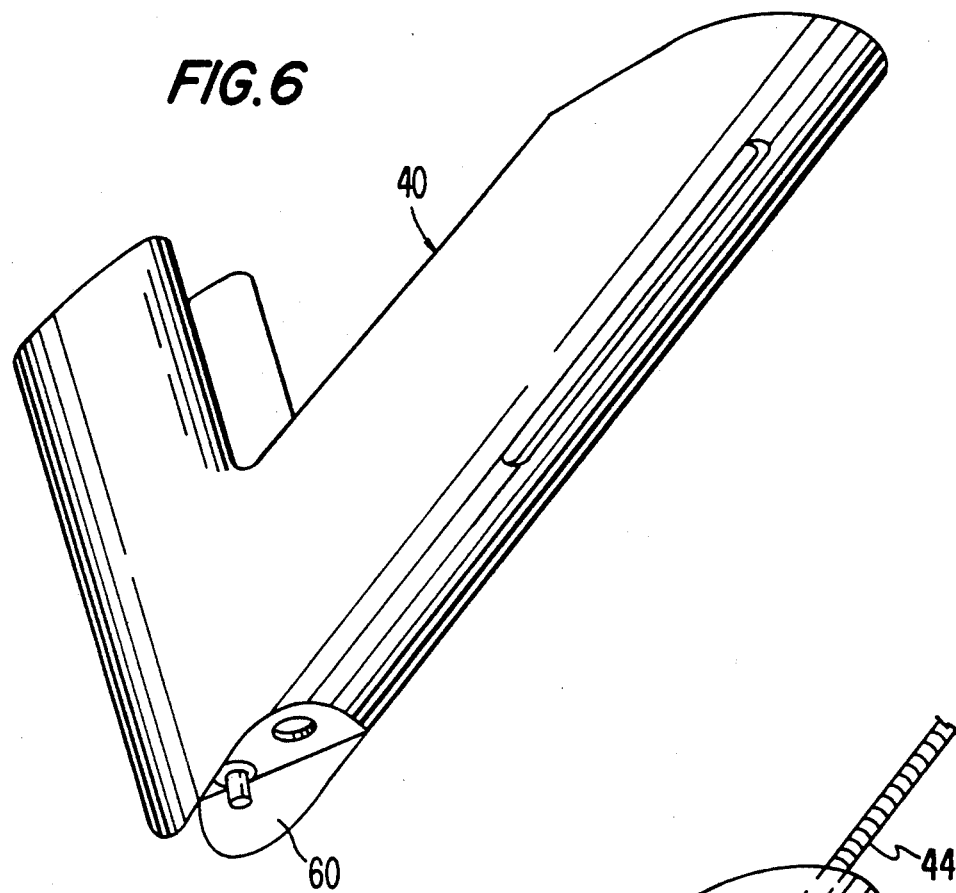
FIG. 6 is a perspective view of the support cage of the pressurized fluid dispensing device illustrated in FIG. 5.
Figure 8:
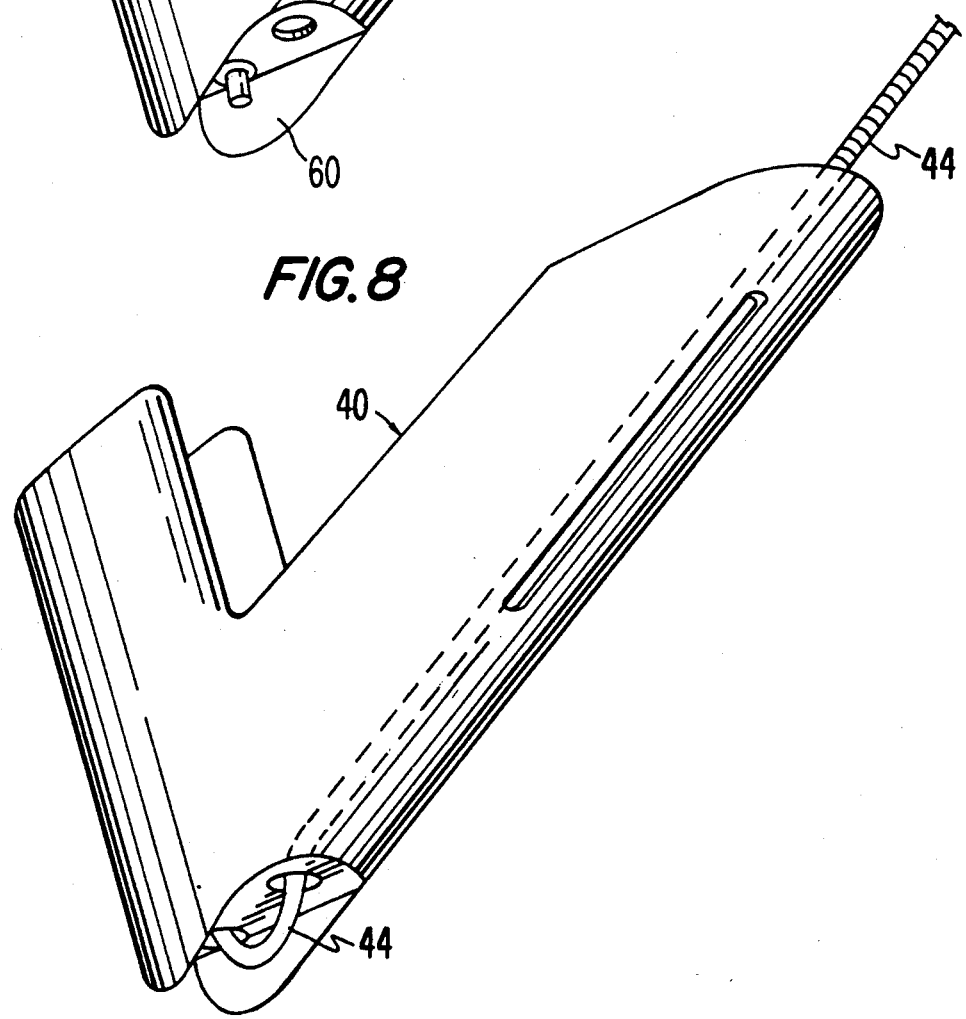
FIG. 8 is a perspective view of the support cage illustrating the tubing of the pressurized fluid dispensing device.

In the preferred embodiment of the pressurized fluid dispensing device 30 of the present invention illustrated in FIGS. 5, 6 and 8, the support cage 40 is of a generally V-shape and includes two generally lateral sides 50 interconnected by a generally vertical side 52 and a generally diagonal side 54. The side 54 is generally rounded to reduce drag and make the device more streamline.

Figure 2:
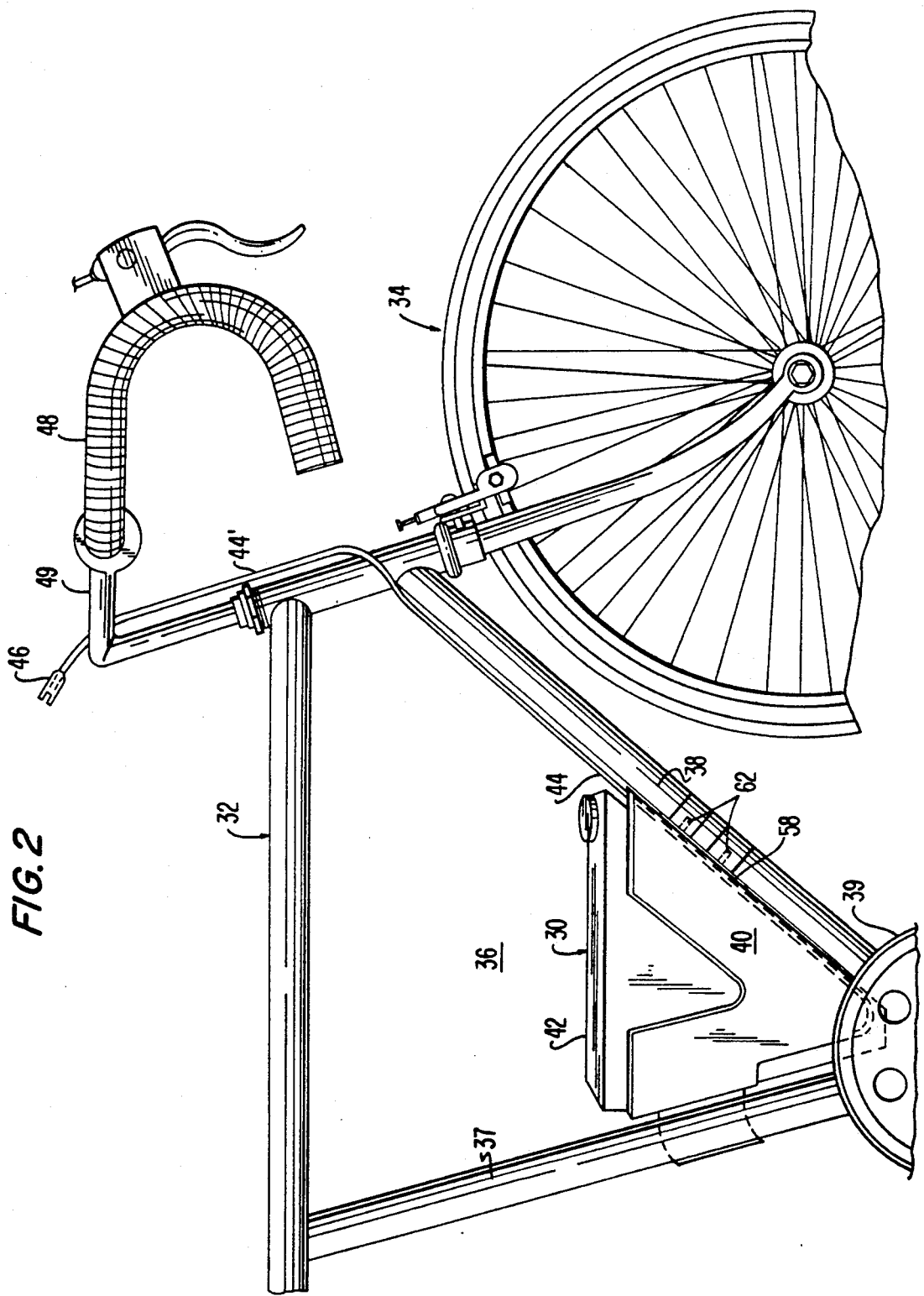
FIG. 2 is an enlarged, fragmentary view of the bicycle illustrated in FIG. 1.

As illustrated in FIG. 5, a groove or a pair of fins 56 extend along the vertical side 52 of the cage 40 for resilient engagement with the vertical support 37 of the triangle 36 of the bicycle frame. A foam sleeve or other resilient means may be provided between the cage 40 and the vertical support to prevent the two from rubbing and vibrating, and to insure resilient engagement of the cage with the vertical support. In the preferred embodiment, the diagonal side 58 of the cage 40 includes an extending portion 58 for abutting engagement with the diagonal support 38. The extending portion 58 includes a groove 59 extending along the length thereof. As illustrated in FIGS. 2 and 3, screws 62 or other fastening means may be inserted through the groove 59 of the extending portion into corresponding openings formed in the diagonal support 38 of the bicycle frame 34 and tightened for securing the support cage 40 to the bicycle frame.

A nipple 60 extends from the bottom of the support cage 40 as illustrated in FIG. 5 and in greater detail in FIG. 7. The nipple 60 is dimensioned to be sealingly engageable with the inner surface of the tubing 44 as illustrated in FIG. 8.

Figure 9:
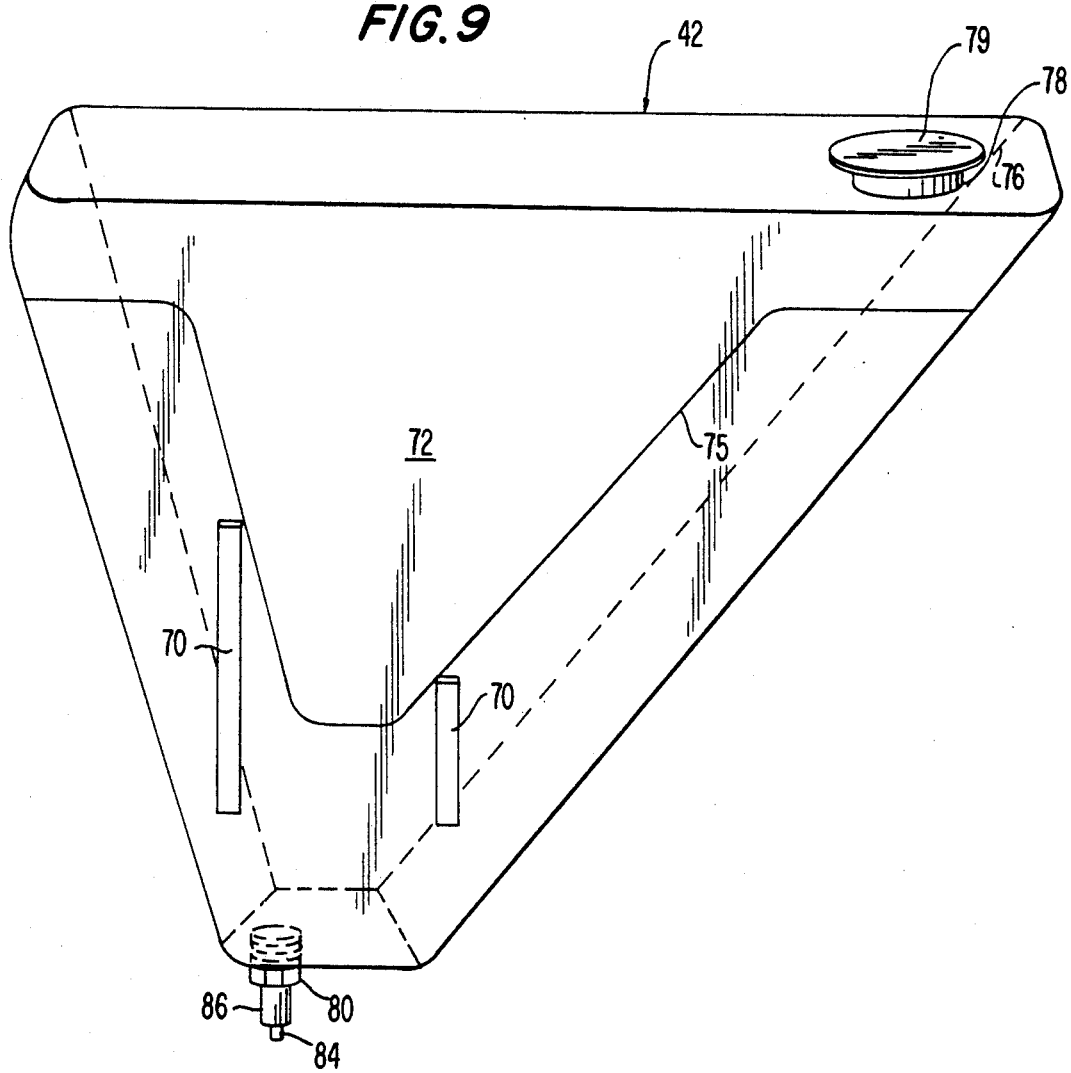
FIG. 9 is a side view of the fluid vessel of the pressurized fluid dispensing device.

As illustrated in FIG. 9, the fluid vessel 42 includes a hollow cavity for containing fluid therein, such as for example water. The vessel 42 is of generally wedge-shape for insertion into the support cage 40. In the preferred embodiment, a pair of ribs 70 extend from the lateral sides 72 of the vessel 42. The ribs 70 (illustrated in FIG. 7) are slidingly engageable with corresponding grooves 74 (illustrated in FIG. 5) formed in the inner portion of the lateral sides 50 of the support cage 40.

In the preferred embodiment, the vessel 42 includes a raised portion 75 corresponding to the outer configuration of the lateral sides 50 of the support cage. In this way, when the vessel 42 is inserted into the support cage 40, the raised portion 75 of the vessel abuts the contour of the support cage and locks in place and makes it a flushed, streamlined surface to reduce air turbulence.

An opening 76 is formed in the top of the vessel with a lip 78 extending therefrom through which fluid may be placed into the hollow cavity of the vessel 42. A lid or snap on cap 79 is engageable with the lip 78 of the opening to seal the vessel.

In addition, a check valve 80 extends from the bottom of the vessel 42 as illustrated in FIG. 9. The check valve includes a biased, extending portion 84 which when fully extended prevents the flow of fluid from the vessel and which when depressed permits the flow of fluid from the vessel. The check valve may be inserted into a recess 82 formed in the bottom of the support cage 40 as illustrated in FIGS. 5 and 7. Such a valve is commercially available from, for example, Colder Products Company of St. Paul, Minnesota. The particular valve is not essential to the present invention as long as it selectively prevents and permits the flow of fluid from the vessel.

An O-ring seal 86 is disposed in a recess formed in the outer wall of the check valve. The O-ring seal 86 comes in contact with the wall of the recess 82 formed in the support cage to seal the interconnection of the vessel 42 and the support cage 40. Accordingly, when the vessel 42 is inserted into the support cage 40, the check valve 80 sealingly engages the recess 82, and when fully inserted into the cage, the bottom of the recess depresses the extending portion 84 of the check valve to permit the flow of fluid therefrom as illustrated in FIGS. 7 and 10.

Figure 10:
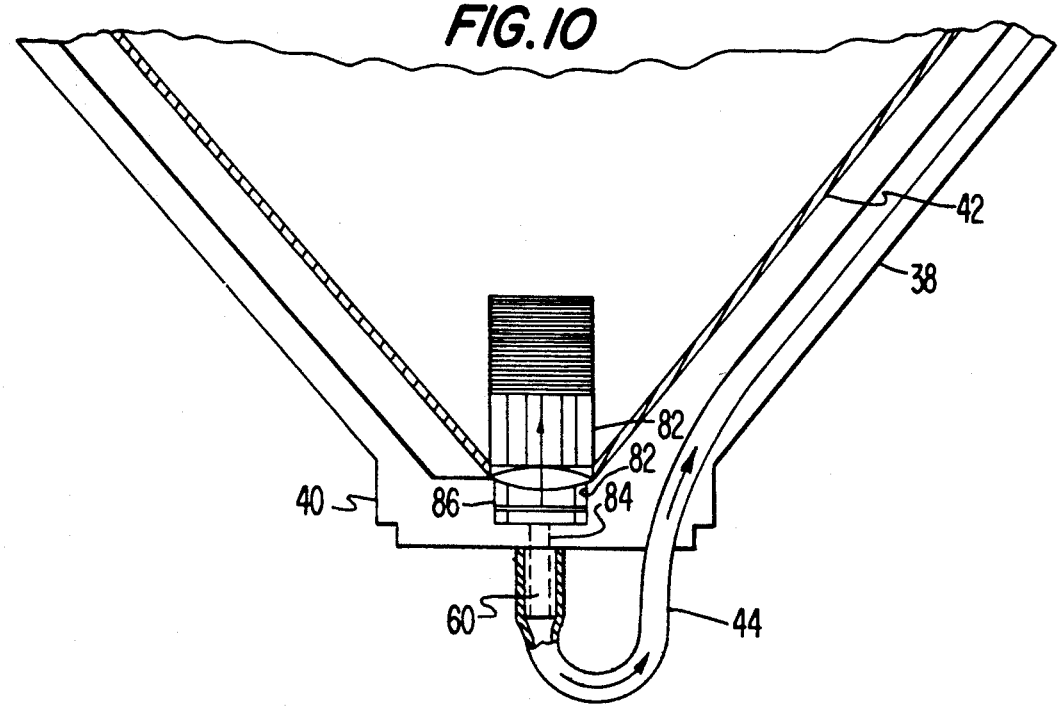
FIG. 10 is a fragmentary, side view of the support cage and fluid vessel illustrating the details of the interconnection therebetween.

As illustrated in FIG. 10, a passage is formed between the support cage 40 and the vessel 42 along the their diagonal sides through which the tubing 44 may pass.

Figure 11:
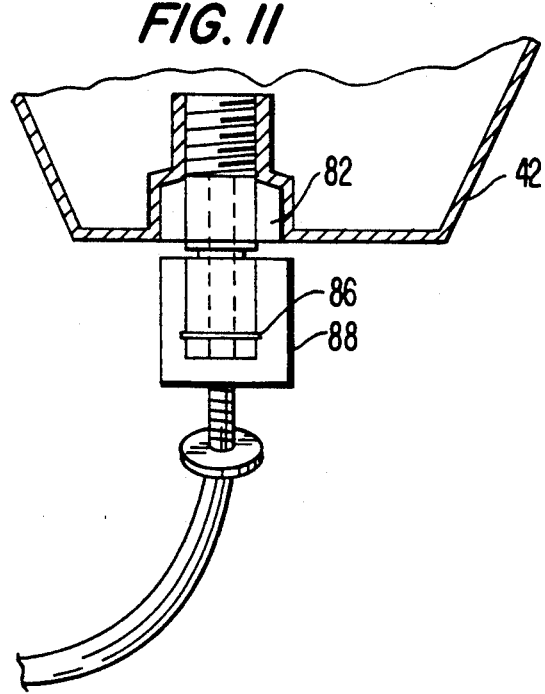
FIG. 11 is a enlarged, side view of the check valve of the fluid vessel illustrating the adapter for pressurizing the fluid contained therein.

Fluid contained within the vessel 42 may be pressurized by using an adapter 88 to connect the check valve to a bicycle pump, $CO_2$ cartridge, or similar means for supplying pressurized air as illustrated in FIG. 11. To provide an indication of the amount of pressure exerted within the vessel, the cap may include a pressure indicating valve or similar means. As an alternative, the cap 79 may be replaced with a screw cap or a radiator type cap which will allow the individual to pump up the vessel 42 until pressure is released by the cap to let the person know that the pressure in the vessel is at an appropriate level.

As illustrated in FIG. 4, the actuateable valve 46 includes a generally hollow member 90 tapering at one end to form a tube engaging portion 92 for sealing engagement with the tubing 44 or 44'. The other end of the member 90 includes an opening 94 though which fluid may pass. Located within the hollow member near the opening 94 is a pair of opposed flanges 96 which are in fluid sealing engagement, but which are separated from one another when the hollow member 90 is deformed from, for example, being bitten. Deformation of the hollow member 90 separates the flanges 96 to allow fluid to flow through the hollow member 90. The particular valve is not essential to the present invention as long as it may be actuated by the mouth of the rider.

Figure 12:
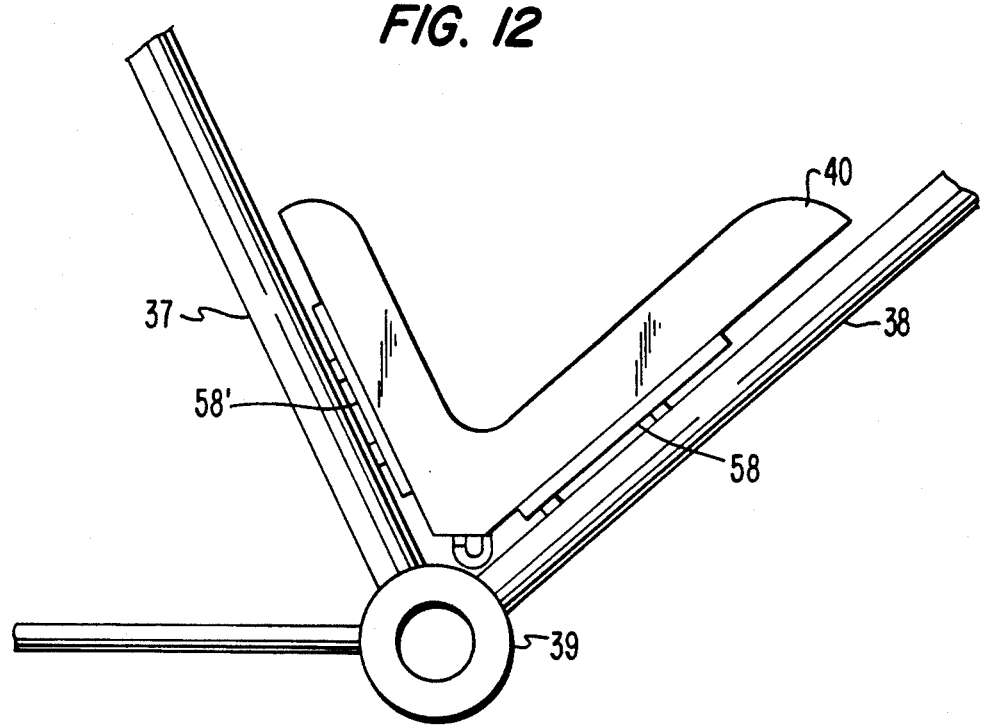
FIG. 12 is a side view of the support cage of the pressurized fluid dispensing device mounted to the bicycle frame shown in fragmentary.
Figure 13:
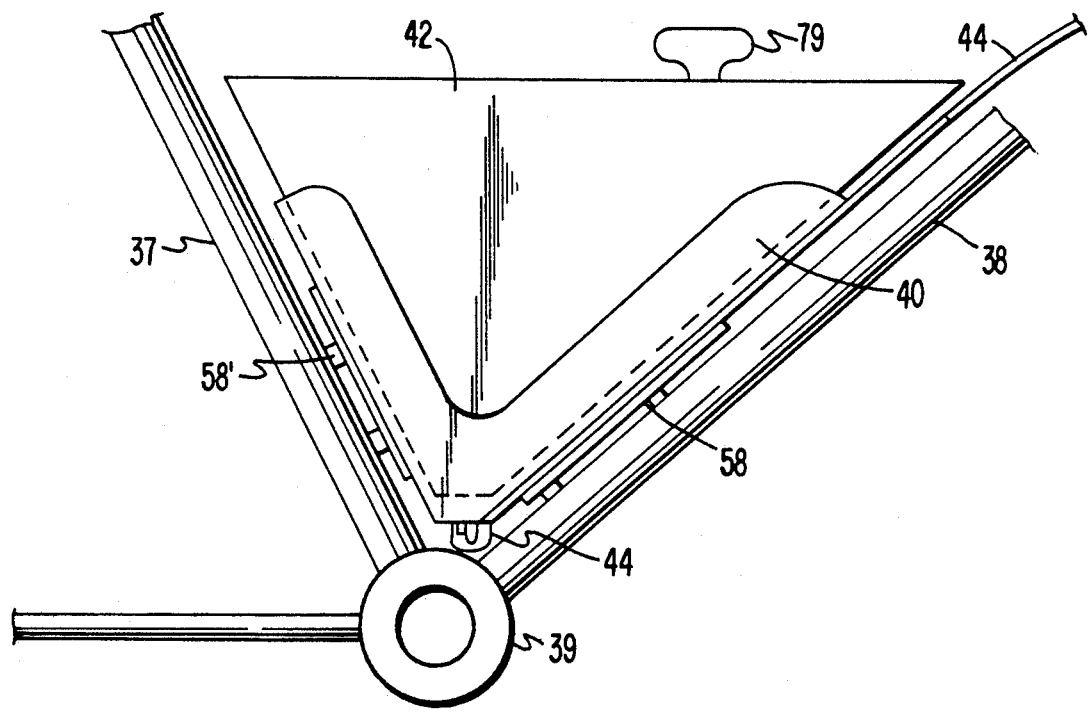
FIG. 13 is a side view of the support cage of FIG. 12 with the fluid vessel inserted therein.
Figure 14:
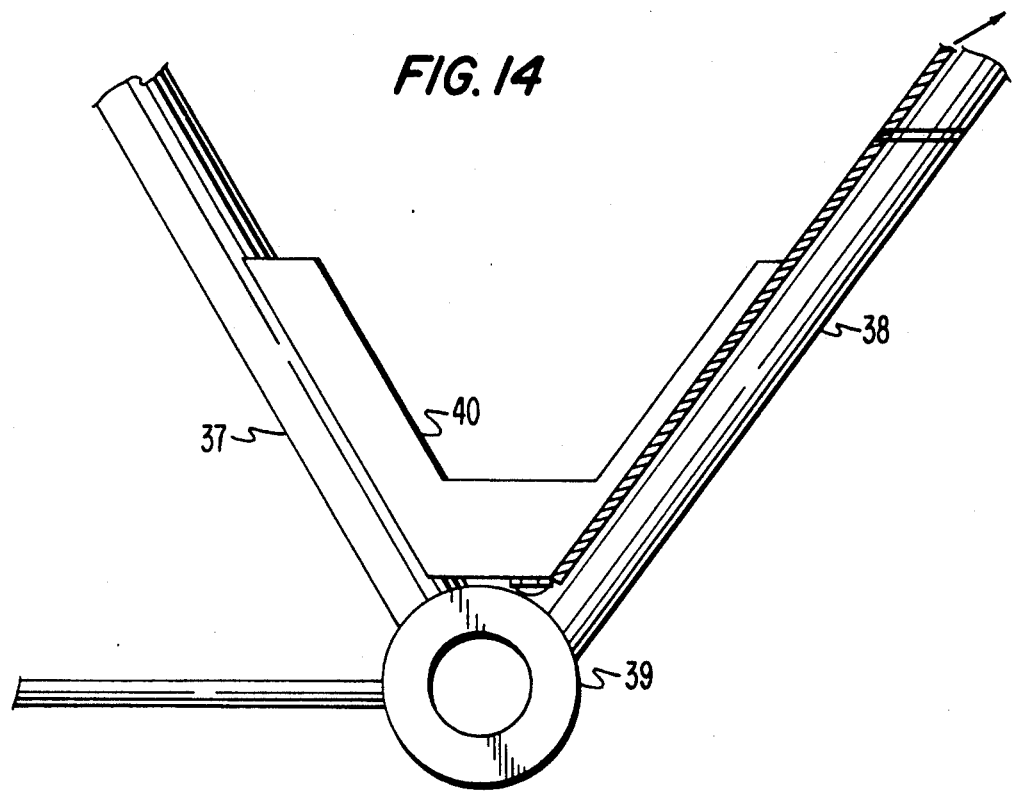
FIG. 14 is a side view of an alternative embodiment of the support cage of the pressurized fluid dispensing device mounted to the bicycle frame shown in fragmentary.
Figure 15:
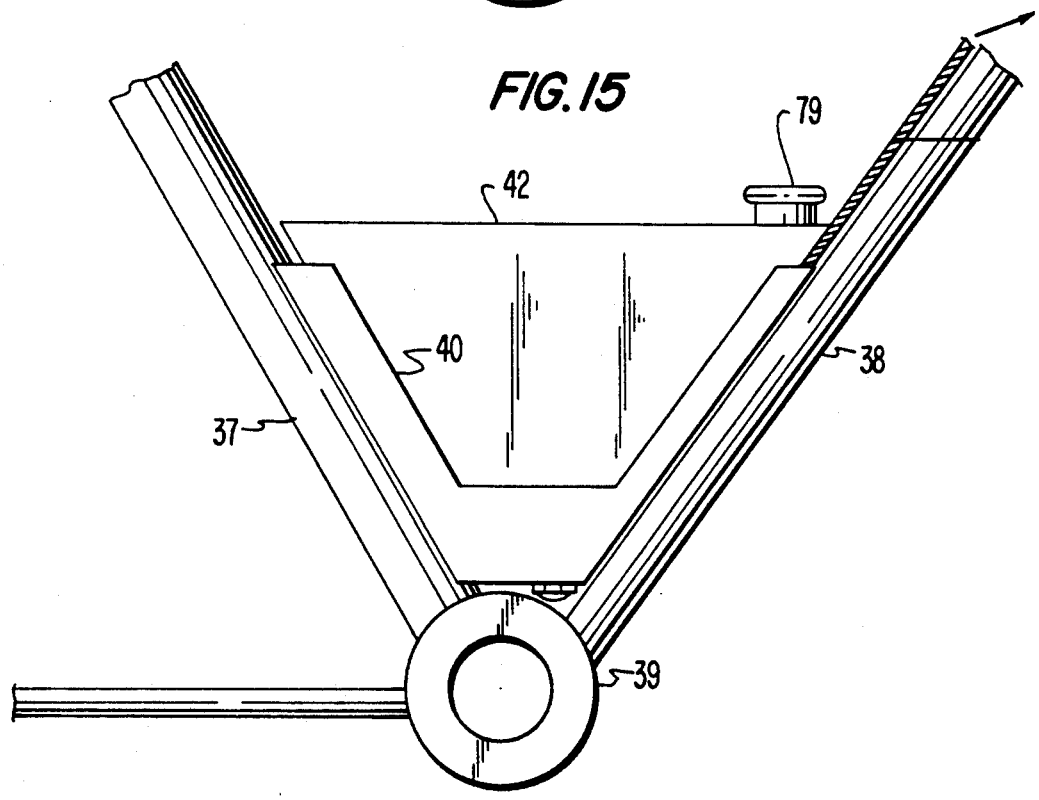
FIG. 15 is a side view of the support cage of FIG. 14 with the fluid vessel inserted therein.
Figure 16:
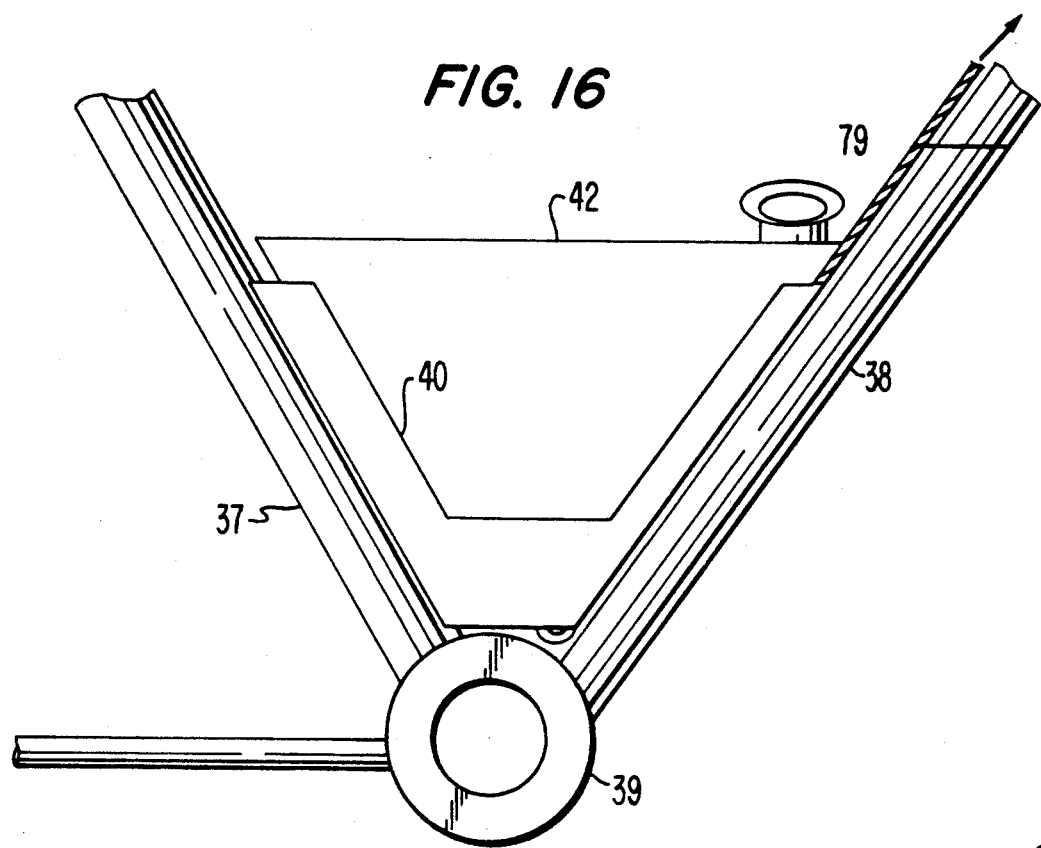
FIG. 16 is a side view of another embodiment of the support cage with the fluid vessel inserted therein.
Figure 17:
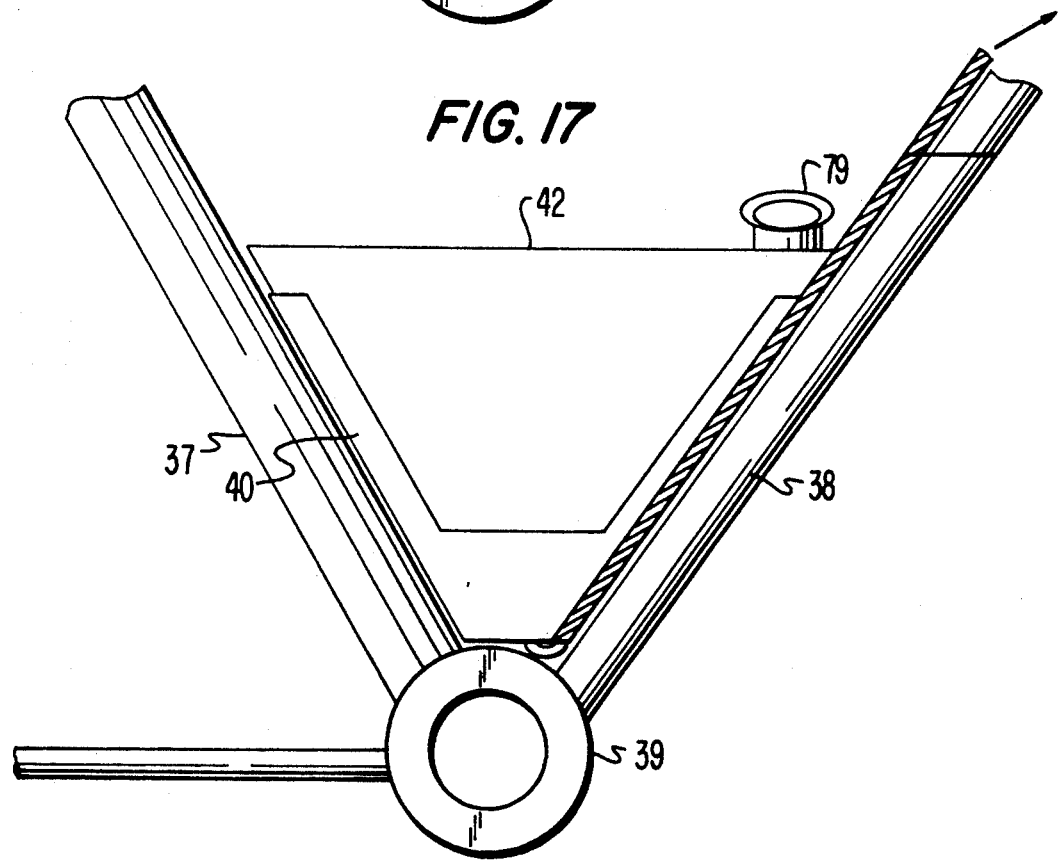
FIG. 17 is a side view of another embodiment of the support cage with the fluid vessel inserted therein illustrating the passage of the tubing between the fluid vessel and the support cage.

In an alternative embodiment of the support cage 40' illustrated in FIGS. 3, 12 and 13, the groove 56 may be replaced with an extending portion 58' for abutting engagement with the vertical support 37 in much the same way as the other extending portion 58. It should be appreciated that various means may be utilized for mounting the support cage to the bicycle including clamps and the like. The particular means is not significant to the pressurized fluid dispensing device 30 of the present invention.

The support cage of the pressurized fluid dispensing device 30 of the present invention may be made in a variety of sizes. FIGS. 14–17, illustrate various embodiments of the pressurized fluid dispensing device 30 of the present invention in which the sides of the support cage 40 are of various dimensions and propositions. Such dimensions are not intended to limit the present invention.

The materials used for construction of the support cage 40 and the fluid vessel 42 is not essential to the present invention and may be made from a variety of materials having properties of being light-weight but durable, impermeable and flexible, such as polymer materials.

The product can be manufactured by several manufacturing processes well known to those skilled in the art. Normally, the manufacturers of this product will select the best commercially available material, based upon price, application and manufacturing process such as injection molding.

The particular material of which the tubing 44 and 44' is made is not essential to the present invention and may be made from a variety of materials having properties of impermeability, flexibility, and durability such as polymers, including polyvinylchloride, polyolefin, polypropylene etc., and in the case of tubing 44' may include reinforcing wires.

OPERATION AND USE

The pressurized fluid dispensing device 30 of the present invention is readily adaptable for use in athletic endurance events such as for example a bicycle tour, biathlon, triathlon and the like as illustrated in FIG. 1 mounted to a bicycle. It should also be appreciated that the device may be used in auto racing and like events.

In use, the fluid vessel is supplied with a fluid, such as water, and sealed. Then the vessel is connected to a bicycle pump by an adapter 88 and pressurized to the desired level. Next the pressurized vessel is fully inserted into the support cage 40 mounted to the frame 32 of a bicycle above the center bracket or crank assembly 39 so that the check valve 80 engages the recess 82 of the support cage 40. In this way, the extending portion 84 of the check valve is depressed to permit pressurized fluid to flow from the vessel 42 along the tubing 44.

In order for the rider to obtain fluid during competition, he/she simply has to bite on the actuateable valve 46 to deform the hollow member 90 and obtain the desired amount of fluid and release the valve once the desired amount of fluid has been obtained. Further, if the rider desires to refresh her/his self, the rider can squeeze the actuateable valve 46 by hand to spray fluid therefrom.

Once the fluid in the vessel is exhausted, the spent vessel can be removed and replaced with a new pressurized fluid vessel. Replacement of the vessel can be readily accomplished by a simple hand-off during competition or using a musette bag or sling in which the replacement vessel is hung for handing-off.

Furthermore, it should be appreciated that in the event of a pressure failure, the vessel can be removed much like a conventional water bottle, and by simply removing the cap or depressing the extending portion 84 of the check valve 80, fluid can still be obtained by the rider.

While the preferred embodiment of the present invention has been described so as to enable one skilled in the art to practice the device of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. A pressurized fluid dispensing device for use by athletes in endurance events, comprising:
   a pressurizable vessel having a top, a bottom, a generally vertical side, a generally diagonal side, two generally lateral sides, and a sealable opening in said top, said vessel being pressurizable for storing a fluid therein under pressure;
   a support cage mountable to the frame of a bicycle, said support cage having a generally vertical side, a generally diagonal side, and a bottom;
   mounting means for attaching said support cage to a triangle of said bicycle frame above a center bracket to locate the weight and center of gravity of said bicycle as low as possible;
   a check valve extending from the bottom of said vessel in fluid communication with said vessel and sealingly engageable with a recess formed in the bottom of said support cage, the check valve includes a biased, extending portion which when fully extended prevents the flow of fluid from said vessel and which when depressed permits the flow of fluid from said vessel so that when said vessel is sealingly engaged with said support cage, said biased, extending portion of said check valve comes in contact with a bottom of said recess to depress the biased, extending portion to permit fluid to flow through said check valve from said vessel;
   flexible tubing having a first end and a second end, said tubing attached at said first end to the bottom of said support cage in fluid communication with said check valve for communicating said fluid from said vessel to an athlete;
   attaching means for attaching the second end of said tubing to the handle bars of said bicycle; and
   an actuateable valve sealingly connected to the second end of said tubing so that fluid may be selectively dispensed from said tubing upon actuation of said actuateable valve by the mouth of said athlete.

2. The pressurized fluid dispensing device defined in claim 1, wherein said actuateable valve includes a deformable, hollow member, whereby when a cyclist deforms said deformable, hollow member by biting thereon, fluid is released from one end thereof.

3. The pressurized fluid dispensing device defined in claim 1, wherein said support cage is mountable above a crank assembly of said bike and engageable with a generally vertical support of said frame and a generally diagonal support of said frame to lower the center of gravity of said bicycle.

4. The pressurized fluid dispensing device defined in claim 1, further comprising a cap for sealing said opening in said vessel.

5. The pressurized fluid dispensing device defined in claim 1, wherein said vessel is of generally wedge-shape and said support cage is of generally V-shape.

6. The pressurized fluid dispensing device defined in claim 1, wherein said check valve includes an O-ring seal which comes in contact with a wall of said recess to seal the interconnection of said vessel and said support cage.

* * * * *